Jan. 1, 1957 J. A. PENDLEBURY 2,776,027
AUTOMATIC BRAKING SYSTEM FOR AIRCRAFT
Filed July 7, 1954 3 Sheets-Sheet 1
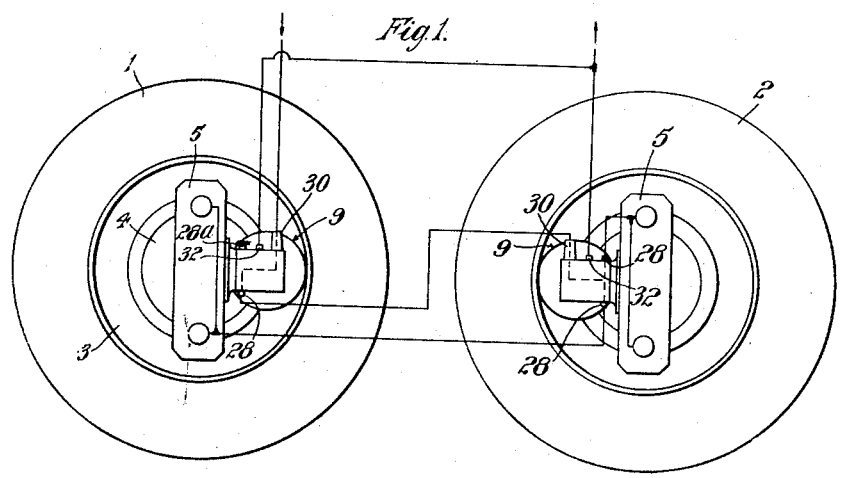
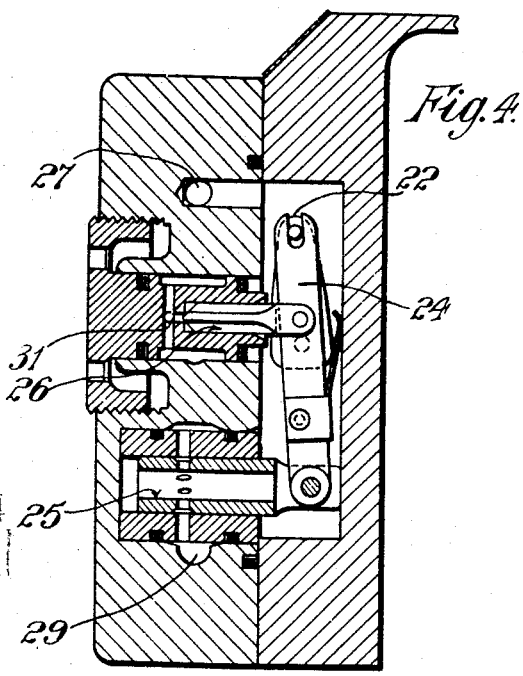
INVENTOR
John Allen Pendlebury
by Benj. T. Rauber
his attorney Jan. 1, 1957 J. A. PENDLEBURY 2,776,027
AUTOMATIC BRAKING SYSTEM FOR AIRCRAFT
Filed July 7, 1954 3 Sheets-Sheet 2

INVENTOR
John Allen Pendlebury
by Benj. T. Rauber
his attorney

Jan. 1, 1957  J. A. PENDLEBURY  2,776,027
AUTOMATIC BRAKING SYSTEM FOR AIRCRAFT
Filed July 7, 1954  3 Sheets-Sheet 3

INVENTOR
John Allen Pendlebury
by Benj. T. Rauber
his attorney

United States Patent Office 2,776,027
Patented Jan. 1, 1957

2,776,027

AUTOMATIC BRAKING SYSTEM FOR AIRCRAFT

John Allen Pendlebury, Coventry, England, assignor to Dunlop Rubber Company Limited, London County, England, a British company Application July 7, 1954, Serial No. 441,785

Claims priority, application Great Britain July 17, 1953

6 Claims. (Cl. 188—181)

My invention relates to automatic braking systems for aircraft, particularly for aircraft having undercarriages comprising two or more landing wheels coupled together on a single strut, as, for example, a twin-wheel or bogie type undercarriage.

Automatic braking apparatus for aircraft wheels is known comprising a rotary inertia mechanism rotatably driven by a wheel end means associated with said mechanism for automatically controlling the braking pressure to the wheel brakes, thereby to prevent sliding or skidding of said wheel. Such an apparatus is described and claimed, for example, in Patent 2.656,017, October 20, 1953, and is sold under the trademark "Maxaret."

When an automatic braking apparatus of this type is fitted to each of a pair of single wheels carried by struts on opposite sides of the longitudinal axis of an aircraft the sudden releasing of braking pressure in one wheel may cause the aircraft to swing, while in the case of aircraft having a pair of wheels carried by each strut such release may also result in a couple which will damage the strut.

My invention provides an automatic braking system wherein this disadvantage is avoided.

According to my invention, an automatic braking system for aircraft comprises a pair of landing wheels, fluid pressure operated brakes associated with each wheel, an automatic braking apparatus associated with each wheel for governing the braking pressure in accordance with the angular velocity of the wheel, and means connecting the apparatus together in such a manner that automatic release of braking pressure from one wheel releases it from the other wheel also.

According to a preferred embodiment of my invention, an automatic braking system for aircraft comprises a pair of landing wheels, fluid-pressure operated brakes associated with each wheel and a rotary inertia automatic braking apparatus associated with each wheel for governing the braking pressure in accordance with the angular deceleration of the wheel, each of said apparatus comprising an inlet connection for pressure fluid, an exhaust connection and an outlet conncetion, wherein the outlet connection of one of said apparatus is connected to the inlet connection of the other apparatus, and the outlet connection of said other apparatus is connected to both wheel brakes.

The invention is particularly applicable to aircraft having two undercarriage struts, each having a pair of landing wheels rotatably mounted at one end thereof, and will now be described with reference to the accompanying drawings of which:

Figure 1 is a diagrammatic illustration of the method of interconnecting automatic braking apparatus to a pair of wheels rotatably mounted on a strut of an aircraft undercarriage of the type described.

Figure 4 is a part section through B—B of Figure 2 looking in the direction of the arrows.

Figure 2:
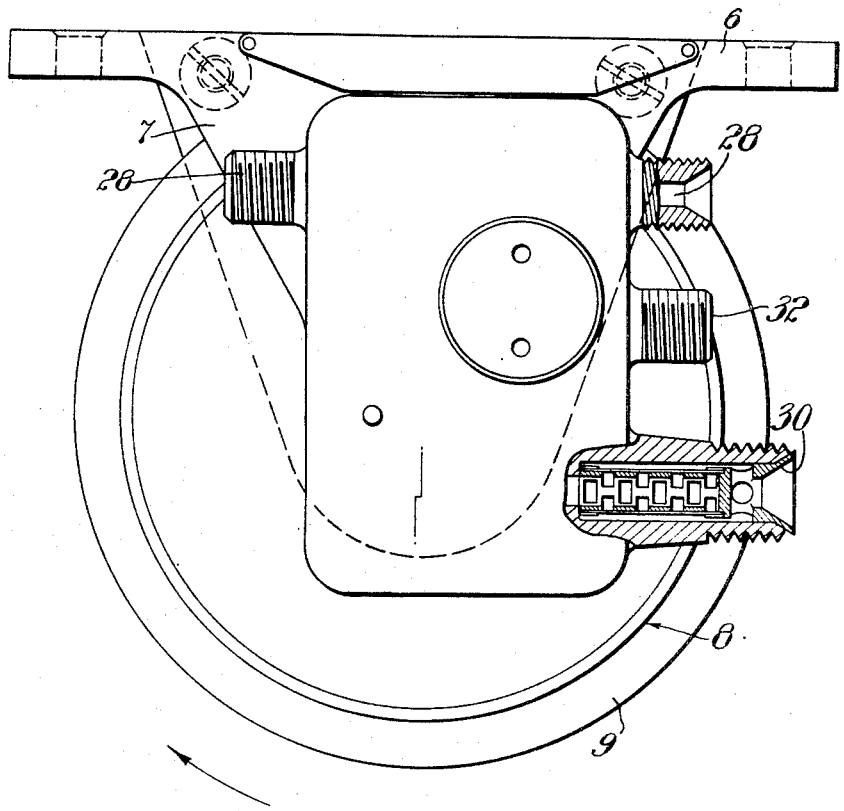
Figure 2 is a side elevation, partly in section of one embodiment of an automatic braking apparatus incorporated in the present invention.

Associated with each wheel 1 and 2 (Figure 1) is a disc brake assembly comprising a pair of radially spaced annular braking discs 3 and 4 rotatably secured to an aircraft wheel, and a torque plate 5 extending diametrically across the radially extending faces of the discs supporting diametrically opposed assemblies of fluid pressure operated mechanisms and friction pads whereby said braking discs 3 and 4 may be frictionally engaged. Such a disc brake is more fully described in said Patent No. 2,656,017. Secured to the torque plate 5 of each brake is an automatic braking apparatus of the rotary inertia type more fully described in said Patent No. 2,656,017 which comprises a flange 6 (Figure 2) having a bifurcated bracket 7 integral therewith in which a hollow cylindrical housing 8 is rotatably mounted.

The exterior periphery of the housing is provided with a solid rubber contact tire 9 which is adapted to contact the inner periphery of the wheel rim whereby the housing rotates freely with the wheel.

Figure 3:
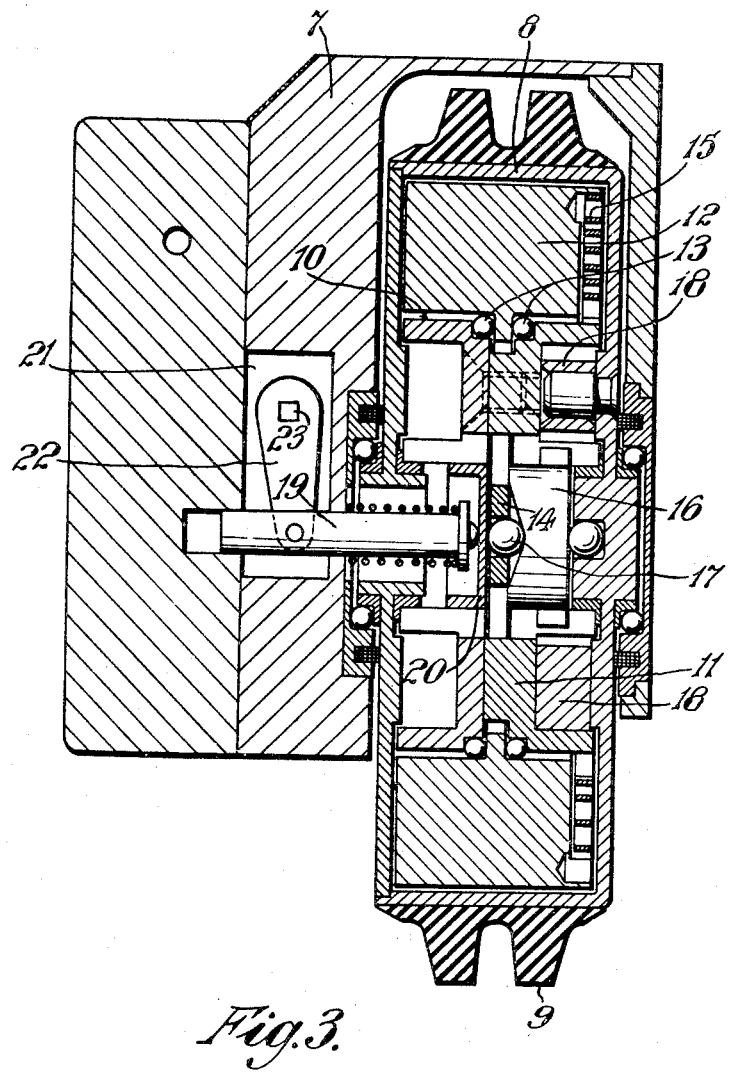
Figure 3 is a section through A—A of Figure 2 looking in the direction of the arrows.

An annular drum member 10 (Figure 3) is fitted within the housing having a diametrically extending slot formed on the median plane thereof whereby two substantially arcuate portions 11 are formed.

An annular space is provided between the outer periphery of the drum member 10 and inner periphery of the housing, and an annular flywheel 12 is located within said space, being rotatably supported on bearings 13 located between adjacent peripheries of the flywheel and drum. A thin beam 14 extends diametrically across the interior of the flywheel 12 passing between the arcuate portions 11 of the drum 10 thereby to restrict the relative angular movement of the said drum and flywheel, and a clock type spring 15 located in a recess formed in one radially extending face of the flywheel urges the drum and flywheel into a position wherein one side of each of the portions 11 abuts the beam 14.

A cam member 16 is fitted within the inner periphery of the drum member being rotatable therewith, and being located on one side of the flywheel beam 14. The face of the cam member 16 adjacent the beam 14 is provided with a shallow recess of V-section and two balls 17 supported in holes in the beam 14 are adapted to lie in the apex of the V sectioned recess.

A clutch mechanism is fitted in a recess in the drum member comprising two torque arms 18 having portions thereof which frictionally engage with the periphery of the said recess whereby the value of the torque exerted on the drum varies with the direction of relative rotation between the torque arms and drum member.

An operating rod 19 spring loaded and slidably supported in a hole in one arm of the bracket 7 has one end abutting a disc 20 which in turn abuts the balls 17, thereby urging them into the apex of the V sectioned groove of the cam member 16. The other end of the operating rod 19 extends into a recess 21 and pivotally engages with a cranked lever 22 which in turn is supported on a spindle 23 pivotally supported in a wall formed in the recess 21. The wall forms the recess into two chambers, and one arm of the cranked lever 22 is located in one chamber, and another arm extending diametrically opposite thereto, is located in the other chamber.

A rectangular valve body details of which are shown in Figure 4 is secured to the face of the bracket arm, thereby sealing the two chambers formed by the wall in the recess 21. A lever arm 24 located in one of the said chambers is pivotally associated with one arm of the cranked lever 22. A tubular inlet valve 25 is secured to one end of the lever arm 24 and an exhaust valve 26 is likewise secured to said arm intermediate the ends thereof.

A pressure conduit 27 connects the chamber with the brake operating nozzles 28 (Figure 2), a further conduit 29 connects the inlet valve to an inlet nozzle 30, and a passage 31 connects the exhaust valve to an exhaust nozzle 32.

The outlet or brake operating nozzles 28 are connected to the braking apparatus associated with a wheel of the aircraft, the inlet nozzle 30 connected to a source of fluid pressure, and the exhaust nozzle 32 to a reservoir, and the apparatus operates in a manner fully described in said Patent No. 2,656,017.

In the present embodiment of the invention, however, the inlet nozzle 30 of the apparatus associated with the port landing wheel 1 is connected to the source of fluid pressure, one outlet nozzle 28a is blanked off and the other outlet nozzle 28 is connected to the inlet nozzle 30 of the apparatus associated with the starboard landing wheel 2. One outlet nozzle 28 of the apparatus associated with the starboard wheel 2 is connected to the brake operating mechanisms of the brake associated with that wheel, whilst the other starboard outlet nozzle 28 is connected to the brake operating mechanisms associated with the port wheel 1. The exhaust nozzles 32 of both the port and starboard apparatus are connected to exhaust.

As the aircraft lands the pilot applies braking pressure through a valve (not shown) under his control and this pressure flows into the automatic braking apparatus of the port wheel 1 through said apparatus to the port outlet nozzle 28 and thence to the inlet nozzle 30 of the apparatus of the starboard wheel. From said starboard apparatus braking pressure flows through the outlet nozzles 28 to the brake operating mechanisms of both the port and starboard wheels. Braking pressure is thus applied equally to both wheels which decelerate at a uniform rate.

Should the port wheel 1 decelerate at a faster rate than the starboard wheel 2, due, e. g., to its striking a patch of ice or oil on the runway, or to some other cause, then the automatic braking apparatus associated with the port wheel 1 will automatically operate the valve mechanism within said apparatus to cut off or restrict the flow of pressure fluid from the source which is flowing through said port apparatus to the starboard apparatus. With the flow to the starboard apparatus thus restricted or interrupted, the braking pressure to both wheel brakes will be relieved, even though the valve mechanism within the starboard apparatus is still fully open to permit the flow of pressure fluid to the brakes. With the braking pressure to both brakes relieved, any undesirable couple on the undercarriage strut is prevented.

If, on the other hand, the starboard wheel 2 should decelerate at a faster rate than the port wheel 1, then although the full pressure from the source is flowing from the port apparatus to the starboard apparatus, the automatic braking apparatus associated with the starboard apparatus will automatically operate the valve mechanism within said apparatus to cut off or restrict the flow of pressure fluid from the port apparatus to both the port and the starboard wheel brakes.

Thus it will be seen that the braking pressure to both port and starboard wheel brakes will be governed by the wheel having the lowest angular deceleration and, should one wheel of the pair tend to skid or slide, the braking pressure to both wheels will be relieved simultaneously. This will avoid any undesirable couple on the undercarriage strut.

All four wheels of the undercarriage, i. e. two to each strut, may be coupled together in like manner so that the source of supply of pressure fluid is connected to the inlet nozzle of the apparatus associated with the first wheel and the outlet nozzle of this apparatus is connected to the inlet nozzle of the apparatus associated with the second wheel as already described. The outlet nozzle of the apparatus associated with the second wheel however, is connected to the inlet nozzle of the apparatus associated with the third wheel and the outlet nozzle of this apparatus is connected to the inlet nozzle of the apparatus associated with the fourth and ultimate wheel. The outlet nozzle of this ultimate apparatus is connected to all the brakes of the four wheels of the undercarriage, the system functioning to prevent the aircraft from swinging off course if the braking pressure to any of the associated wheels is suddenly relieved or reduced.

It will be understood that any outlet nozzles of the apparatus incorporated in the described systems which are not in use would be blanked off to prevent loss of pressure fluid.

Whilst the invention has been described in connection with the automatic braking apparatus described and claimed in Patent No. 2,656,017 and sold under the trade name "Maxaret" it is not necessarily restricted to this apparatus, and may be associated with any automatic braking apparatus governed by wheel acceleration and deceleration and comprising a connection to a source of fluid pressure, a connection to exhaust and a connection to the wheel brake.

Furthermore the invention is applicable to undercarriage struts having bogie undercarriages, i. e. two pairs of wheels, in which the automatic braking apparatus associated with the wheels of one strut may be coupled in series, in the manner described, so that the wheel brakes associated with one strut are governed by the wheel having the lowest angular deceleration; alternatively the apparatus of the wheels of both struts may be coupled in series in a manner as described.

Having now described my invention what I claim is:

1. An automatic braking system for aircraft comprising a pair of landing wheels, fluid-pressure operated brakes associated with each wheel and a rotary inertia automatic braking apparatus associated with each wheel for governing the braking pressure in accordance with the angular deceleration of the wheel, each of said apparatus comprising an inlet connection for pressure fluid, an exhaust connection and an outlet connection, a conduit connecting the outlet connection of one of said apparatus to the inlet connection of the other apparatus, and a conduit connecting the outlet of said other apparatus to both wheel brakes.

2. An automatic braking system of claim 1 in which the landing wheels of said pair are on opposite sides of the longitudinal axis of the aircraft.

3. An automatic braking system for aircraft in accordance with claim 1 wherein each said automatic braking apparatus comprises a housing to be rotated by one of said wheels, a flywheel rotatable in said housing, a drum-member also rotatable in said housing and capable of limited angular displacement relative to said flywheel, means movable axially by said angular displacement, and a valve mechanism comprising an inlet connection for pressure fluid, an exhaust connection and an outlet connection, whereby on relative angular displacement between the drum-member and flywheel in one direction the axially-movable means operates the valve mechanism to reduce the braking pressure and on relative angular displacement in the other direction the axially movable means operates the valve mechanism to restore the braking pressure.

4. An automatic system for controlling the supply of pressure fluid to the brakes of landing wheels of aircraft which comprises control valves, one for each brake and each having an inlet opening, an exhaust opening and a delivery opening, and a valve mechanism for each control valve to close the inlet and open the exhaust and alternatively to open the inlet and close the exhaust, a conduit connecting the delivery opening of one valve to the inlet opening of a succeeding valve and a conduit leading from the delivery opening of the succeeding valve to deliver to said brakes, and a rotary inertia automatic braking control for each valve comprising a driving member rotatable from a landing wheel, a rotary inertia member driven by said driving member and having a limited rotation independent of said driving member, and mechanism to actuate said valve mechanism to close the inlet and to open the exhaust of its respective valve upon deceleration of said driving member relative to said rotary inertia member.

5. An automatic system for controlling the supply of pressure fluid to the brakes of landing wheels of air craft which comprises control valves, one for each brake and each having an inlet opening, an exhaust opening and a delivery opening, and a valve mechanism for each control valve to close the inlet and open the exhaust and alternatively to open the inlet and close the exhaust, a conduit connecting the delivery opening of one valve to the inlet opening of a succeeding valve and a conduit leading from the delivery opening of the succeeding valve to deliver to said brakes, and a rotary inertia automatic braking control for each valve comprising a pair of rotary elements, one of said elements being a fly wheel and the other being a wheel driven element to drive said fly wheel forwardly, said fly wheel being rotatable to a limited position forwardly of its driving position relative to said wheel driven element, a cam rotatable by one of said pair of rotary elements, a cam follower movable with the other element and actuated by relative movement of said cam to actuate said valve actuating mechanism.

6. The apparatus of claim 5 in which said cam is secured to the wheel driven element and the cam follower is carried by the fly wheel.

References Cited in the file of this patent

UNITED STATES PATENTS

| | | |
|---|---|---|
| 2,447,710 | McCune et al. | Aug. 24, 1948 |
| 2,656,017 | Trevaskis | Oct. 20, 1953 |